UNITED STATES PATENT OFFICE.

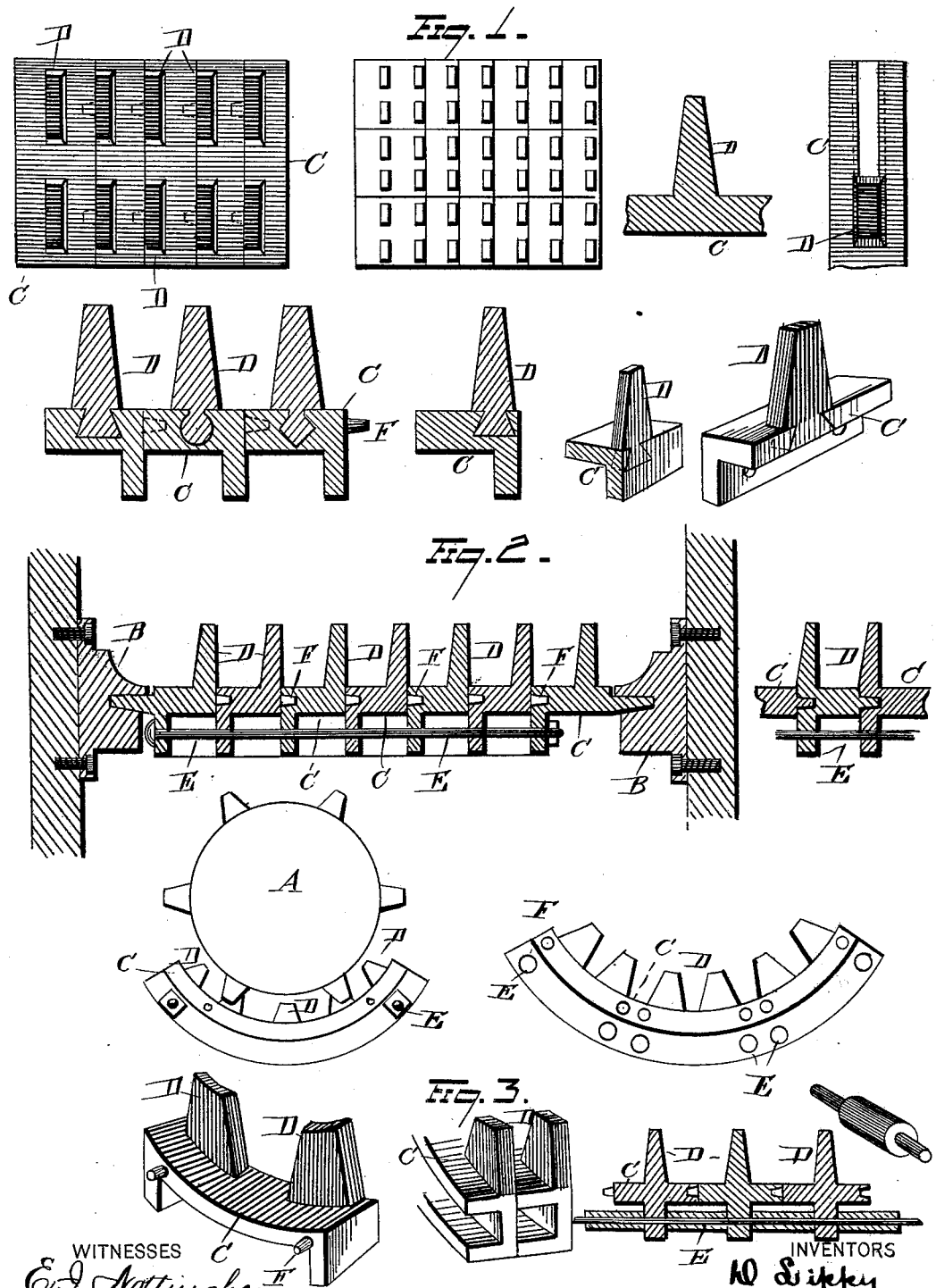

DAVID LIPPY, OF MANSFIELD, AND ZALMON S. STOCKING, OF CLEVELAND, OHIO.

IMPROVEMENT IN CLOVER-HULLING CONCAVES.

Specification forming part of Letters Patent No. 214,254, dated April 15, 1879; application filed December 4, 1878.

*To all whom it may concern:*

Be it known that we, DAVID LIPPY, of Mansfield, in the county of Richland, and ZALMON S. STOCKING, of Cleveland, in the county of Cuyahoga and State of Ohio, have invented certain new and useful Improvements in Clover-Hulling Concave; and we do hereby declare the following to be a full, clear, and exact description of the invention, such as will enable others skilled in the art to which it pertains to make and use it, reference being had to the accompanying drawings, which form part of this specification.

Our invention relates to a new and improved concave designed to replace the ordinary thrashing-concave in an ordinary grain-thrashing machine, in order to convert it into a clover thrasher and huller; and the invention consists in certain details of construction and combinations of parts, as will hereinafter be described, and pointed out in the claims.

In the accompanying drawings, Figure 1 represents plan views of a hulling-concave and sectional and perspective views of detached portions of the same. Fig. 2 shows a transverse section of a concave, illustrating the devices for securing the sections in place. Fig. 2 also includes views, in side elevation, to illustrate more clearly the fastening devices. Fig. 3 represents views, in perspective and in section, of portions of our improved concave.

Heretofore it has been customary in making concaves of this nature to make them in separate lags extending crosswise across the machine, the ends of each lag being housed within the concave rest, and it has been customary to make the teeth of wrought metal or malleable iron, each tooth projecting into or through the lag and fastened by nuts beneath. This, however, has been an expensive structure, and the teeth or spikes frequently fly out by reason of the loss of the nuts. We propose, however to make the concave in sections, the sections running circumferentially of the concave throughout its whole breadth; or the concave may be made of separate lags or slats, each lag being made up of these separate sections suitably fastened together, the teeth being cast solid with the lag, or else being made of wrought or malleable metal and cast into the sections, or made removable from the said sections by securing them thereto with dovetail or other connections, so that in case any tooth should become broken, that particular section or (in case the teeth were removable) that particular tooth could be removed and replaced by a new section or tooth.

A represents a thrashing-cylinder of an ordinary grain-thrashing machine. B represents the concave rests for the ordinary grain-thrasher concave which our huller concave is designed to replace. C C C represent the sections of the concave. These may be made to extend the whole breadth of the concave, or they may be made to contain one, two, or more teeth each, so that when bolted together they shall form a stave or lag of the concave, the ends being provided with suitable flanges for fitting into the concave-rests.

As a general rule we prefer to make the sections so as to contain one or two teeth each, so that should any tooth become broken, there shall be but slight expense of valuable parts in replacing the said broken section. The teeth D may be cast solid with the section C, or they may be of wrought metal cast into the sections; or, if desired, the teeth may be adapted to slide into place, or be housed in suitable dovetail recesses, so as to be rigidly secured when in use, or readily removable for the purposes of repair or for the insertion of new teeth. These different variations are shown in the separate sketches or detached views. The teeth may be of any suitable height or breadth; but we prefer generally that the said teeth shall be long and roughened or fluted upon their sides and ends, in order that when they replace the thrasher-concave of an ordinary grain-thrashing machine they shall project well up, so as to come very near to the surface of the thrasher-cylinder, in order that a hulling action may take place between the ends of the teeth D and the surface of the thrashing-cylinder.

The sections C are preferably so cast (as shown) that they will rest firmly against each other at their sides and ends, but open beneath, so as to require a minimum quantity and weight of metal. They may be secured together in any suitable manner, as by bolts E or by dowel-pins F, or by any other suitable means, the particular method of connecting them forming no essential part of our invention.

It will thus be seen that the teeth are secured without the intervention of nuts, and the structure is much cheapened and repairs simplified. The surfaces of the teeth and of the upper sides of the sections C are preferably roughened, so that there may be as great rubbing action as possible.

What we claim is—

1. A clover-hulling concave consisting of circumferential sections, each provided with teeth, the several sections of the concave secured to each other, the entire concave being made bodily removable, substantially as set forth.

2. A clover-hulling concave consisting of circumferential sections provided with removable teeth, the adjacent edges of the sections being arranged to abut against each other, and provided with means for securing the several sections to each other, the entire concave being made bodily removable, substantially as set forth.

3. A clover-hulling concave composed of lags, each lag formed of circumferential sections, and provided with one or more teeth, the several lags firmly secured together, the concave complete being removably secured within the concave-rests, substantially as set forth.

4. A clover-hulling concave consisting of circumferential lags bearing teeth, the several sections secured by bolts or tie-rods located beneath the concave, the latter being made bodily removable from the ordinary concave-rests, substantially as set forth.

5. A clover-hulling concave consisting of circumferential sections detachably secured to each other, said sections provided with undercut grooves and removable teeth secured therein, substantially as set forth.

6. A clover-hulling concave adapted to take the place of the thrashing-concave of an ordinary grain-thrashing machine, consisting of circumferential sections furnished with teeth, the end sections of the concave being provided with suitable flanges or extensions, whereby it is adapted to fit within the rests of a thrasher-concave, substantially as set forth.

In testimony whereof we have signed our names to this specification in the presence of two subscribing witnesses.

DAVID LIPPY.
ZALMON S. STOCKING.

Witnesses:
 WELLS W. LEGGETT,
 A. J. TWITCHELL.